June 27, 1961  D. F. WINNEK  2,989,911
APPARATUS FOR PROCESSING PHOTOGRAPHIC ELEMENTS
Filed June 16, 1955  6 Sheets-Sheet 1

INVENTOR.
DOUGLAS F. WINNEK
BY
ATTORNEYS

June 27, 1961  D. F. WINNEK  2,989,911
APPARATUS FOR PROCESSING PHOTOGRAPHIC ELEMENTS
Filed June 16, 1955  6 Sheets-Sheet 2

INVENTOR.
DOUGLAS F. WINNEK
BY
*Kenyon & Kenyon*
ATTORNEYS

FIG. 9

INVENTOR.
DOUGLAS F. WINNEK

June 27, 1961  D. F. WINNEK  2,989,911
APPARATUS FOR PROCESSING PHOTOGRAPHIC ELEMENTS
Filed June 16, 1955  6 Sheets-Sheet 4

FIG. 10

| CIRCUITS | ONE COMPLETE CYCLE OF 5 DEGREE IMPULSES AT 45 SECONDS EACH | | | | | | | | | | | |
|---|---|---|---|---|---|---|---|---|---|---|---|---|
| | 6 | 12 | 18 | 24 | 30 | 36 | 42 | 48 | 54 | 60 | 66 | 72 |
| TIMER | | | | | | | | | | | | |
| TANK IN | | | | | | | | | | | | |
| DEV. IN | | | | | | | | | | | | |
| HYPO IN | | | | | | | | | | | | |
| WATER IN | | | | | | | | | | | | |
| WATER OUT | | | | | | | | | | | | |
| DEV. OUT | | | | | | | | | | | | |
| HYPO OUT | | | | | | | | | | | | |
| TANK OUT | | | | | | | | | | | | |
| DRYER | | | | | | | | | | | | |

FIG. 11

INVENTOR.
DOUGLAS F. WINNEK
BY
Kenyon & Kenyon
ATTORNEYS

United States Patent Office 2,989,911
Patented June 27, 1961

2,989,911
APPARATUS FOR PROCESSING PHOTOGRAPHIC ELEMENTS
Douglas F. Winnek, Manhasset, N.Y., assignor to Autolab Corporation, a corporation of New York
Filed June 16, 1955, Ser. No. 515,826
5 Claims. (Cl. 95—89)

This invention relates to apparatus and method for processing photographic elements such as photographic films, plates, papers and the like. It relates more particularly to apparatus and method for treating such elements with treating solutions adapted to modify as desired the photosensitive material of a photographic element that has been exposed to radiation.

In typical processing of a photographic element the element is developed, rinsed, fixed, washed and dried. There are many well known developing solutions for use in the developing step. Likewise different types of fixing solutions are well known. The rinsing and washing steps are usually accomplished with water. In the processing of photographic elements other solutions are sometimes used, but in the case of photographic elements used in ordinary photography or X-ray work the foregoing are the basic processing steps and these operations are referred to as typical for the purpose of describing and exemplifying the practice of this invention.

For many years photographic elements have been processed using separate processing containers for the developing and fixing solutions and employing appropriate means for carrying out the rinsing, washing and drying operations, the different manipulations and transfers being effected by hand. In such case the manual operations involved are not only time-consuming but also require the constant attention of an operator. Moreover, for large scale commercial processing a very substantial amount of floor space is required. Heretofore attempts have been made to eliminate much of the manual handling that is involved in the processing of photographic elements in the manner above referred to. These attempts have been principally in the direction of providing mechanisms which utilize separate baths in different compartments, the mechanism in the main merely replacing the hands and fingers of a skilled operator. In this type of equipment the photographic element is suspended by appropriate hanger means and the photographic element held thereby is repeatedly immersed, lifted up, moved along, reimmersed, and so on until all of the various processing steps have been completed.

In the development of a photographic element there are a number of different factors which have to be taken into account in order that a satisfactory result may be obtained. The chemical reactions involved are of a very sensitive nature and extreme care has to be taken in order to obtain the desired optical density and contrasts in optical density, as well as uniformity throughout and freedom from flaws. In the initial development of an exposed photographic element both the temperature of the developing solution and the time of its contact with the photographic element are highly important. Moreover, the extent to which the photographic element is agitated relative to the developing solution plays an important part, for non-uniformity results either from too much agitation or from too little agitation. Likewise aerial fog may occur if there is excessive exposure to air while the element is moistened with the developing solution.

In order that automatic processing equipment may produce satisfactory results, the processing equipment above referred to that has been used commercially heretofore has been very elaborate, costly and bulky. By way of illustration, one type of apparatus for processing X-ray films, e.g., 14" x 17" films at the rate of one per minute, is such as to require from about 200 to 300 sq. ft. of floor space and the service of a plurality of operators even though the equipment is designed to operate automatically. For obtaining the required standards for quality elaborate means are used for repeatedly immersing and removing hangers from the solution baths as well as their transfer from station to station and the provision of intermittent vibration of the hangers designed to create an amount of agitation that is regarded as the most desirable. While equipment of this type enables photographic elements to be processed with the production of satisfactory developed images, nevertheless the bulk and cost of the equipment is such that it usually is impractical except in the case of large scale processing and even for such uses the cost and bulk of the equipment in relation to its efficiency in operation constitutes a very serious drawback. Notwithstanding the disadvantages and drawbacks of such equipment, the bulk of the processing equipment used today is of this type.

Proposals have been made heretofore to utilize a single processing tank in which an exposed photographic element is subjected successively to the various treating solutions, but such proposals have not found substantial commercial applications for various reasons such as lack of efficiency and inferior results.

It is an object of this invention to provide apparatus and method for processing an exposed photographic element which enables an exposed photographic element to be developed with resultant image perfection of a very high order while at the same time employing a processing unit which, while fully automatic, is relatively inexpensive and is of such small size as to be adapted for use wherever needed, preferred embodiments adapted for developing 14" x 17" X-ray films, for example, being comparable in size to an ordinary filing cabinet occupying only five or six sq. ft. of floor space. A further object of this invention is to provide method and apparatus whereby exposed photographic elements may be processed rapidly and with a high degree of efficiency from the point of view of output in relation to initial investment and operating costs.

Another object of this invention is to provide apparatus and method for processing photographic films whereby conditions are provided and maintained for obtaining optimum results as regards development of desired density and contrast as well as uniformity and freedom from flaws. A further object of this invention is to provide apparatus for processing an exposed photographic element whereby except for the initial loading, the employment of dark room illumination is not required. Another object of this invention is to provide apparatus for processing an exposed photographic element which is portable and easily installed and which may be readily serviced as regards the solutions employed. Another object of this invention is to provide apparatus for processing the exposed photographic element which is fully automatic and is adapted to subject the element to the developing cycle from initially dry to finished dry condition without the attention of an operator and to enable a plurality of exposed photographic elements to be so processed simultaneously, thereby providing a large output capacity.

Features and advantages of this invention relate to means and method whereby the aforesaid objects may be attained utilizing a single processing tank adapted for the disposition of one or more exposed photographic elements in contact with the solution contained therein.

Further features and advantages of this invention relate to means and method by which the processing solutions and rinsing and washing liquid are introduced into and withdrawn from the processing tank for effective and properly timed contact with an exposed photographic element within the tank. Other features of this invention relate to the means and method employed for filling a processing tank, maintaining turbulence therein and emptying said tank.

Further features of this invention relate to the means and method employed for filling and emptying said tank and for maintaining turbulence therein utilizing treating solutions from a plurality of reservoirs and a washing liquid. Other features and advantages of this invention reside in the employment of conduit and fluid impelling means which are common to the plurality of solutions for effecting their ingress and egress with respect to the processing tank while at the same time avoiding solution contamination.

Further features and advantages of this invention relate to the means and method employed for bringing into contact with a photographic element a treating solution used in processing and for controlling the timing of such contact.

Further features and advantages of this invention reside in the method and means whereby the treating solutions and washing liquid are brought into contact with an exposed photographic element for providing optimum conditions as regards timing and the kinetics of contact of the fluid with the exposed photographic element.

Further features and advantages of this invention reside in the provision of a processing tank comprised in a movable drawer of an apparatus unit which merely has to be pulled forward for loading undeveloped exposed photographic elements and for removing the elements after they have been completely processed and dried, the entire processing being carried out automatically when the drawer is closed. Other features and advantages of this invention reside in the provision, in combination with a processing tank comprised in a movable drawer, of a cover relative to which the drawer is movable, the cover means comprising part of the processing means which is utilized when the drawer is in closed position.

Further objects, features and advantages of this invention will be apparent from the following description of certain typical embodiments of this invention which have been shown for purposes of exemplification in the accompanying drawings, wherein.

With reference to the embodiment of this invention shown in FIGS. 1–12, the operating components of the apparatus are shown in assembled relation which, while including solution reservoirs, requires a cabinet which is only about 36" in height and which occupies only about 26" x 40" of floor space. A typical arrangement of the operating components within the cabinet is shown particularly in FIGS. 1–5, although for purposes of clarity all of the operating components have not been shown in these figures. The cabinet as illustrated comprises the front wall 20 having the drawer 21 mounted therein in a generally centrally disposed position. The cabinet may have the end wall 22 at one end thereof and the hinged doors 23 at the other end thereof for providing access to the bottle-shaped reservoirs 24 and 25 for the developing solution and the fixing solution respectively. These reservoirs may be separated from the other parts of the equipment within the cabinet by the partition 26. The cabinet may be provided with the working top 27 and at the rear thereof a backboard 28 is preferably provided. A thermometer scale 29 and the dial 30 of the timer may be conveniently mounted on the backboard 28.

Figures 3, 4, 5, 6, 7, 8:
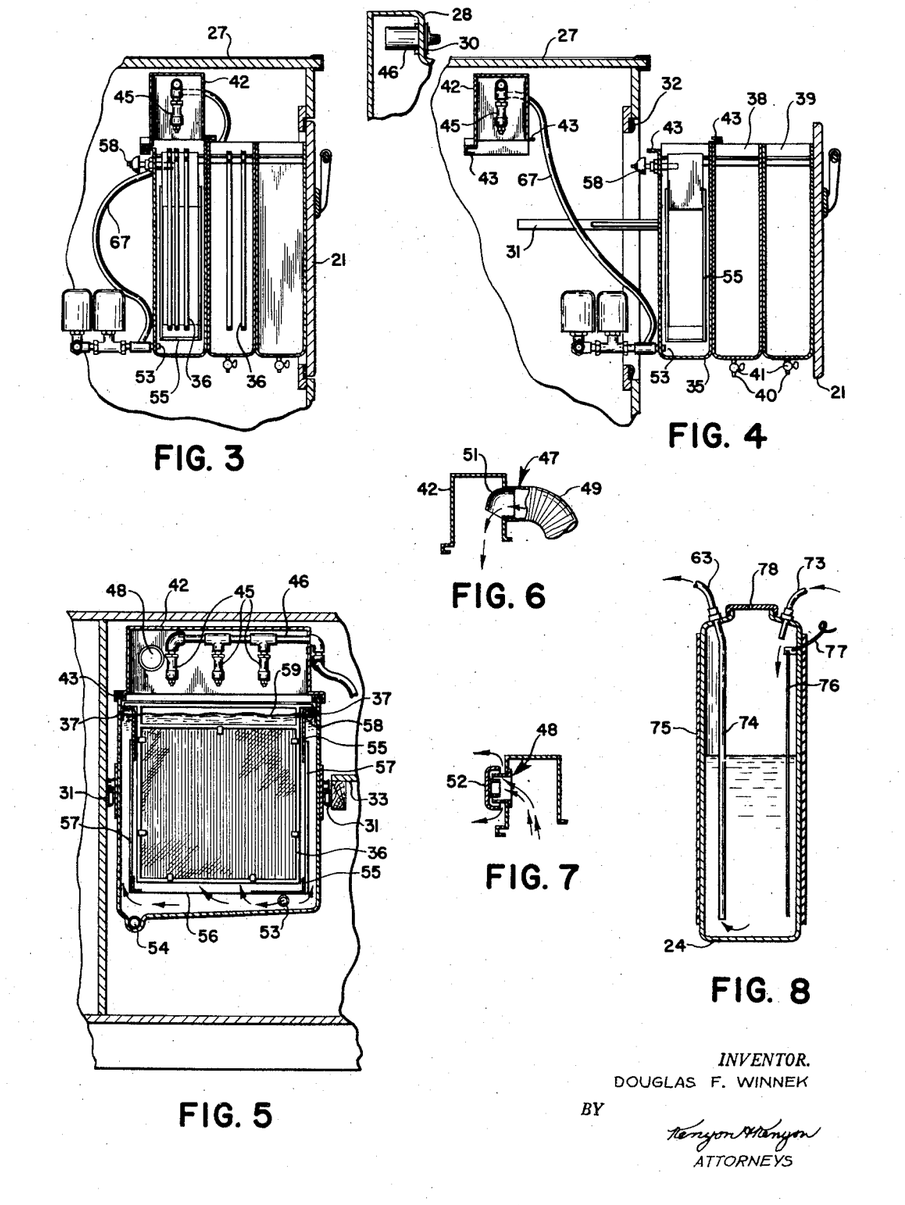
FIG. 3 is a sectional elevation taken on the line 3—3 of FIG. 2 showing the processing tank comprised in the movable drawer and the stationary cover therefor, the drawer being in closed position.
FIG. 4 is similar to FIG. 3 but with the drawer in open position.
FIG. 5 is a sectional elevation taken on the line 5—5 of FIG. 2 and showing further detail respecting the processing tank comprised in the drawer.
FIG. 6 is a detail sectional elevation taken on the line 6—6 of FIG. 2 and showing the air inlet into the cover for the processing tank.
FIG. 7 is a detail sectional elevation taken on the line 7—7 of FIG. 2 and showing the drying air outlet from the cover of the processing tank.
FIG. 8 is a sectional elevation of one of the solution containers used in the unit.

The drawer 21 is carried by suitable means so that it may be readily pulled out with reference to the cabinet to the position shown in FIG. 4. Any suitable carrying device for the drawer may be employed such as the longitudinally slidable rail devices 31 of conventional structure which preferably comprise rollers for facilitating manipulation of the drawer as well as suitable stop means which normally limits the extent to which the drawer may be pulled out. Suitable stop members 32 may be provided for controlling the limit of the inward movement of the drawer. As shown, one of the devices 31 may be carried by the partition 26 and the other may be carried by the margin of a shelf 33 which also is employed as a support for the motor driven pump 34.

The drawer 21 comprises the processing tank 35. The size of the processing tank will depend upon the size of the photographic elements to be developed therein. For example, the processing tank may be of such size as to accommodate X-ray films measuring about 14" x 17" as carried by suitable hangers 36 which may be supported by suitable support rail means 37 adjacent the upper margin of each end of the processing tank. A processing tank having a capacity in the neighborhood of five gallons will accommodate up to about 12 hangers for X-ray films of the size mentioned.

The drawer 21 also comprises the tank compartments 38 and 39 which may, if desired, be used merely for convenient storage of hangers 36 when they are not disposed in the processing tank. However, either or both of the tanks 38 and 39 may be utilized for containing a liquid and either or both would be available for use in manual development of X-ray films in the event of possible emergencies such as a community power failure. These tanks may also be used for other purposes, as will be mentioned hereinbelow. For possible use under such conditions the tanks 38 and 39 are preferably provided with drains 40 controlled by the hand valves 41.

Figure 1:
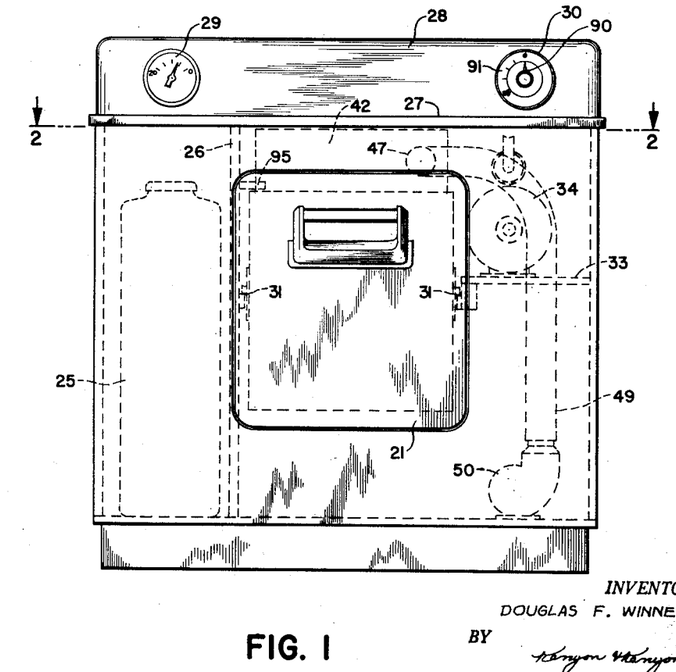
FIG. 1 is a front elevation of a processing unit embodying this invention, the front of the housing cabinet being shown and certain of the operating parts being indicated schematically in dotted lines to illustrate the general arrangement.
Figure 2:
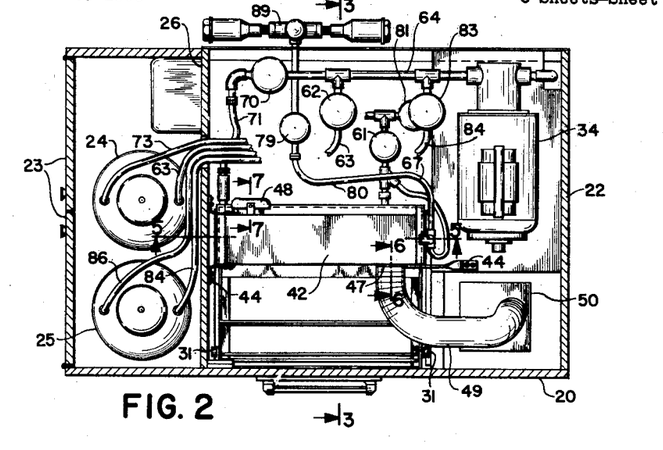
FIG. 2 is a plan view of the unit shown in FIG. 1 taken on the line 2—2 of FIG. 1 and showing the arrangement of the principal operating components, some of which have been omitted for clarity in the showing.

When the drawer 21 is in the inwardly disposed position shown in FIGS. 2 and 3 the top of the processing tank 35 is in liquid-tight engaged relation with the cover 42. The liquid-tight relation between the top of the tank 38 and the cover 42 may be provided by the tongue and groove elements 43 which are shown most clearly in FIG. 4 and which telescope with each other to provide the water-tight union when the drawer is closed. The cover 42 is carried in fixed relation with respect to the cabinet as by the brackets 44.

Within the cover 42 there are mounted the spray nozzles 45, the spray nozzles 45 being connected to the common header line 46 which extends through one end of the cover. The spray nozzles 45 are disposed above the hangers 36 and are adapted to produce a fine spray or atomized mist which quickly and effectively subjects the surfaces of a film held by the hangers 36 to a thorough drenching with the liquid that is sprayed from the nozzles.

The cover 42 also comprises inlet means 47 and outlet means 48 for drying atmosphere, the inlet means and outlet means being shown in detail in FIGS. 6 and 7 respectively. The inlet means 47 is connected by an air conduit 49 to a blower 50 which comprises a heating element (not shown) so as to blow heated air through the conduit 49 and through the inlet 47 into the cover 42. A directional baffle 51 is utilized so as to direct the incoming stream of heated air downwardly into the region of the hangers 36 so as to carry off moisture from films carried by the hangers. As shown in FIG. 7, a baffle cover 52 may be employed overlying the outlet 48 so as to permit the drying atmosphere to escape while at the same time preventing possible ingress of light to the region within the processing tank 35.

The processing tank 35 is provided with a solution inlet 53 and with a solution outlet 54, the bottom of the tank being sloped toward the outlet for facilitating drainage. Spaced from the inner walls of the processing tank 35 there is provided the baffle shell 55 which comprises continuous walls in the region of films handled by the hangers 36 except for the opening 56 in the bottom thereof and the opening 57 at each end thereof. The baffle shell 55 controls the direction of liquid currents introduced into the processing tank 35 through the inlet 53 so as to prevent excessively forceful contact of the incoming solution with films carried by the hangers while at the same time using the flow of incoming solution so as to uniformly set up controlled fluid turbulence with reference to one or more films or other photographic elements carried by the hangers 36 within the processing tank.

Adjacent the upper portion of the inner wall of the processing tank there is disposed a level-controlling probe 58 for the purpose of controlling the level of liquid within the processing tank, as will be described more in detail hereinbelow, the liquid level being indicated at 59 in FIG. 5. In typical processing of a film such as an X-ray film the liquids employed are a developing solution, a fixing solution and water, the latter being used for rinsing and washing. For purposes of brevity, the reservoir bottle used for storing the fixing solution has been marked in the drawings with the legend "Hypo."

Figure 9:
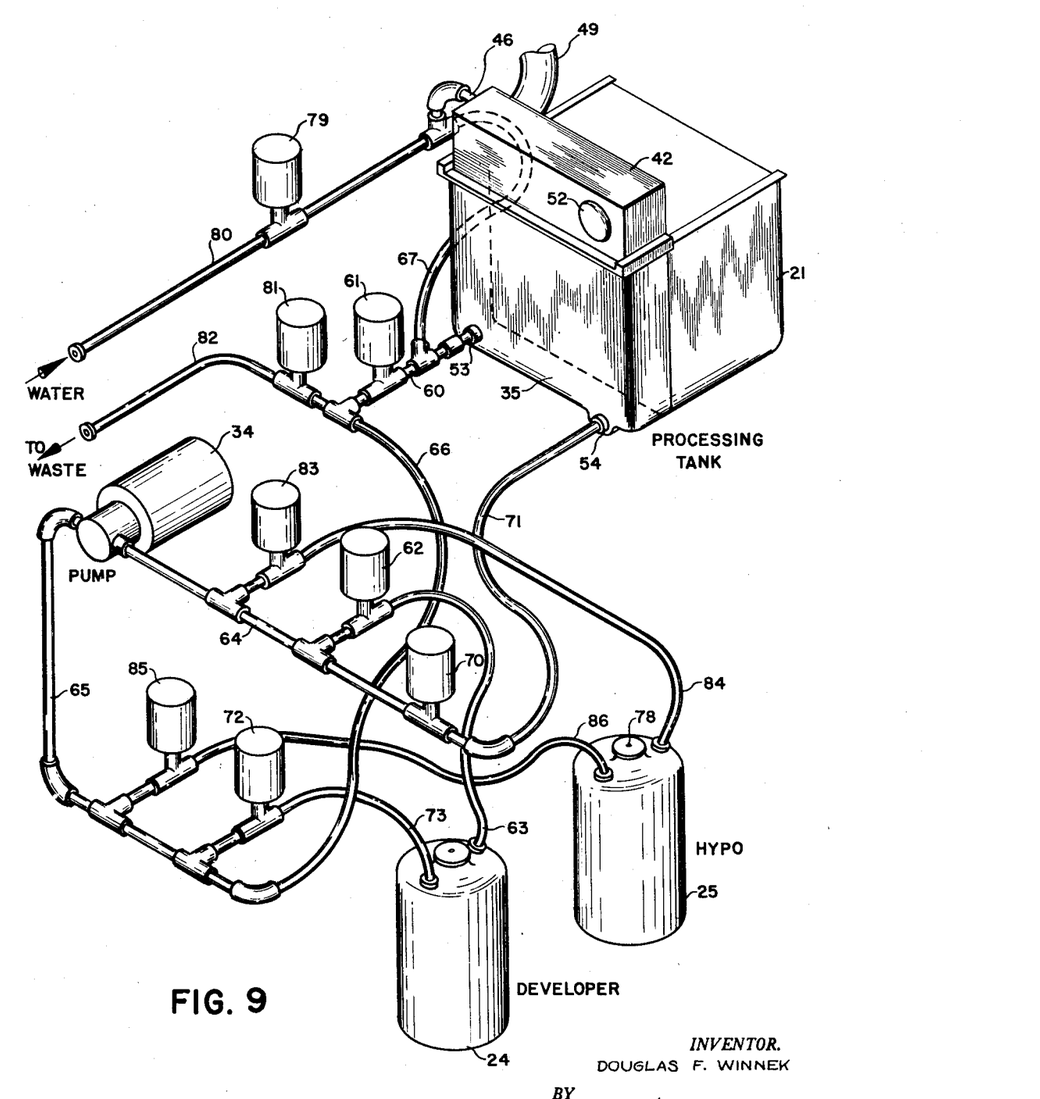
FIG. 9 is a perspective view of the liquid handling operating components of the unit shown in FIGS. 1–8 with their relative separation exaggerated for clarity in the showing and with the cabinet housing removed.
Figure 10:
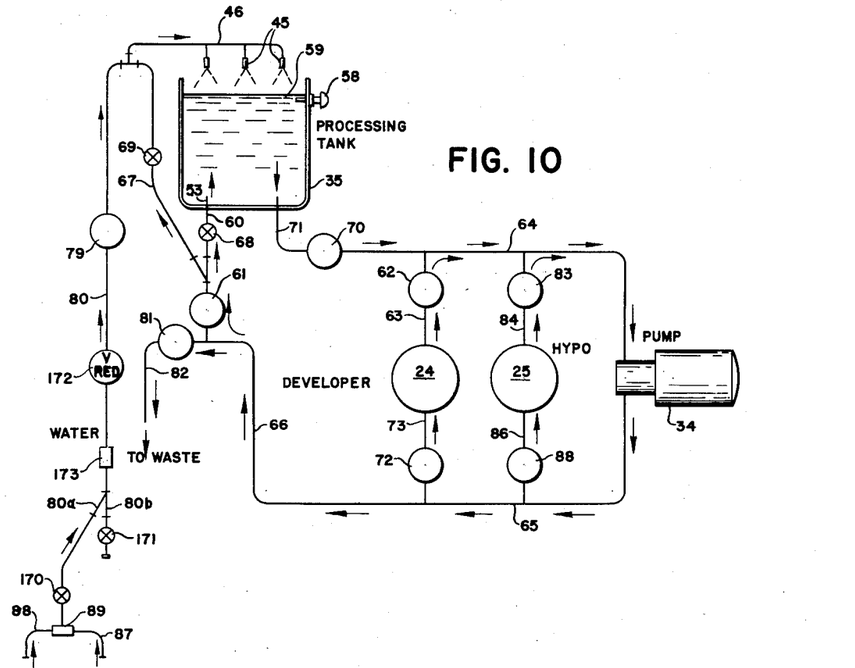
FIG. 10 is a schematic flow diagram of the liquid handling operating components of the unit shown in FIGS. 1–9.

With further reference to FIGS. 9 and 10, the fluid handling components of the embodiment of this invention shown in FIGS. 1–12 will now be described. In this embodiment the control of the flow in the various lines is effected by solenoid valves, each of the solenoid valves being of the type which is normally closed and which is actuated electrically to open it. The flow of both the developing solution and the fixing solution is effected by a single pump which likewise is used for providing a forceful withdrawal of washing liquid from the processing tank and directing it to waste. For introducing wash water into the processing tank one may utilize the water pressure provided by the public service in the area where the apparatus is used.

Extending rearwardly of the inlet 53 of the processing tank 35 there is disposed the inlet line 60 which is controlled by the "tank in" solenoid valve 61. For introducing developing solution from the reservoir 24 into the processing tank 35 the "developer in" solenoid valve 62 may be opened in addition to the "tank in " valve 61. Then, the other solenoid valves being closed, the developer solution will be impelled by the pump from the reservoir 24 by the line 63 that is controlled by the "developer in" solenoid valve 62, through the pump inlet header line 64, through the pump outlet header line 65 through the flexible hose 66 and, lastly, through the line 60 which introduces the developer into the processing tank through the inlet 53. It is preferable that the capacity of the pump and these liquid lines which provide the liquid supply conduit means for the developer have substantial flow capacity so that the processing tank 35 may be rapidly filled. For example, it is preferable to fill the processing tank with developing solution in about 15 to 30 seconds. By way of example, this can readily be accomplished in the case of five gallon processing tank using half inch internal diameter conduits and a pump which delivers liquid at a pressure af about 20 pounds per sq. in.

In addition to the inlet line 60 which communicates with the interior of the processing tank through the inlet 53 a spur line 67 preferably is utilized which provides communication between the inlet line 60 and the header 46 for the spray nozzles 45. By use of the spur line 67 which is connected as aforesaid the developing solution may be simultaneously introduced into the processing tank at the bottom thereof in en masse liquid form and in the top of the processing tank in spray mist or atomized form. In this manner the entire area of films or other photographic elements within the processing tank may be virtually instantaneously contacted throughout with developing solution. In order to provide adjustable control with regard to the amount of solution which flows en masse into the bottom of the processing tank and is introduced in spray form at the top of the processing tank a manually actuated valve 68 may be disposed in the inlet line 60 and the manually actuated valve 69 may be disposed in the spur line 67, as shown diagrammatically in FIG. 10. Using developing solutions having conventional speed characteristics, use of the spur line 67 may be dispensed with without appreciable sacrifice in the uniformity of the development of films or other photographic elements within the processing tank. For this reason the valve 69 may under certain circumstances be closed altogether. Moreover, for certain types of work the spur line 67 may be omitted. However, especially when a developer is used under conditions providing very rapid development it is preferable to utilize the spray nozzles 45. In typical practice one-third of the solution delivered into the processing tank may go to the nozzles 45 and the remaining two-thirds may enter through the inlet 53.

As mentioned above, the device is such that the processing tank may be filled very rapidly, and as soon as the predetermined desired liquid level 59 has been attained the outlet 54 is brought into operation so as to remove solution from the processing tank at substantially the same rate at which it is introduced so as to thereby maintain the level of solution in the processing tank substantially constant and so as to provide liquid motion which maintains the turbulence that enables the developing operation to be carried out both rapidly and with uniformity, the turbulence being controlled so as to neither be excessive nor be too little to be consistent with the attainment of desired rapidity and uniformity of development. Upon thus utilizing the liquid level probe 58 to simultaneously close the "developer in" solenoid 62 and to open the "tank out" solenoid 70, the other solenoids being closed, the developing solution is directed from the tank outlet 54 by the flexible hose connection 71 to the pump inlet header line 64, with the result that the developer will be circulated by the pump from the processing tank 35 and back to the processing tank 35 while maintaining the liquid level within the processing tank substantially constant.

Liquid return conduit means for return of the developer to the reservoir bottle 24 from the processing tank 35 may then be provided by opening the "developer out" solenoid 72 in the line 73 and simultaneously closing the "tank in" solenoid valve 61. In such case the pump, which continues to operate, serves to withdraw the developing solution from the processing tank 35 and return it rapidly to the reservoir bottle 24 for the developing solution, preferably during a period of about 15 to 30 seconds.

The reservoir bottle 24 is shown in detail in FIG. 8. The developer supply line 63 from the exit of the bottle comprises the extension 74 which extends to adjacent the bottom of the bottle so as to permit the withdrawal of substantially all of the developing solution within the bottle. The developer return line 73 discharges the returned developer into the space within the bottle 24. Preferably the bottle 24 is surrounded by a jacket 75 which is utilized so as to maintain the temperature of the solution within the bottle at that temperature which is desired for development. A suitable temperature is in the neighborhood of 68° F. A thermometer 76 is provided within the reservoir bottle 24 which is operatively connected to the thermometer scale 29 shown in FIG. 1 by the connecting line 77. The jacket 75 may comprise thermostatically controlled heating means or cooling means, or both as may be desired, depending on the conditions encountered and to be maintained. An air vent 78 is provided in the top of the bottle reservoir 24 so as to permit the removal and return of developing solution.

The bottle reservoir used for the fixing solution is essentially similar to that hereinabove described for the developing solution except that ordinarily the thermometer is not utilized in the bottle reservoir for the fixing solution.

After the developing solution has been returned to the reservoir bottle 24 and the developing solution has all been removed from the processing tank 35 the films or other exposed photographic elements may forthwith be rinsed with water by spray application from the spray nozzles 45. To accomplish this the "developer out" solenoid valve 72 is closed, the "water in" solenoid valve 79 in the water inlet line 80 is opened and the "water out" solenoid valve 81 in the line 82 going to waste likewise is opened. Under these conditions, and all the rest of the solenoid valves being closed, the rinse water will rinse the developed films in the processing tank 35 and flush out all portions of the liquid circulating system except for the developer supply line 63 and the developer return line 73 which throughout the complete cycle do not handle any solution or liquid other than the developing solution. The rinse water is removed from the processing tank and taken to waste as rapidly as it is collected in the processing tank. Because of the adjustment of the valve 69 in the spur line 67 the rinse water will be caused to be discharged through the spray nozzles 45 and likewise will flush the spur line 67 and the tank inlet line 61.

The fixing solution in the reservoir bottle 25 may next be supplied to the processing tank. This may be accomplished by closing the "water in" solenoid valve 79, the "water out" solenoid valve 81 and the "tank out" solenoid valve 70 and by opening the "tank in" solenoid valve 61 and the "hypo in" solenoid valve 83 which is in the line 84. Under these conditions the fixing solution from the reservoir bottle 25 is pumped into the processing tank 35 in the same way that the developing solution was previously pumped in, as described hereinabove. As soon as the fixing solution reaches the liquid level 59 the "hypo in" solenoid valve 83 is closed and the "tank out" solenoid valve 70 is opened so as to maintain a circulation of fixing solution while the level in the processing tank 35 remains substantially constant. By thereafter closing the "tank in" solenoid valve 61 and opening the "hypo out" solenoid valve 85 in the line 86 continued operation of the pump serves to return all of the hypo from the processing tank 35 to the reservoir bottle 25.

After the fixing solution has been returned to the reservoir bottle 25, the "hypo out" solenoid valve 85 may be closed and the "water in" and "water out" solenoid valves may be opened, whereupon the films or other photographic elements in the processing tank may be subjected to washing with water until the desired amount of washing has been completed.

For both the rinsing and final washing it is usually desirable that the water used for washing be at a temperature that is substantially the same as that at which the developing solution is maintained. For this purpose it is usually preferable, as indicated in FIGS. 2 and 10, to connect the water supply line 80 with both a hot water supply and a cold water supply and to use a mixing device which commingles the hot and cold water in such proportion as to provide the temperature desired. Thus the unit may be connected with a hot water line 87 and a cold water line 88, both of which enter the mixing device 89 that is adapted to discharge water therefrom to the line 80a at the temperature for which the device 89 is set. Alternatively, wash water may be supplied through the extension 80b of the line 80. For shutting off either or both of the lines 80a and 80b suitable valves 170 and 171, respectively, may be employed. Likewise it is desirable that the wash water be admitted under pressure corresponding to that provided by the pump 34. For example, it has been found very satisfactory to employ a pump with a pressure of about 20 lbs. per sq. in. and in such case it is desirable to employ in the line 80 a pressure reducing and regulating valve 172 designed to pass the wash water therefrom at a pressure of substantially 20 lbs. per sq. in. after having been received from a source maintained at a higher and possibly variable pressure. Preferably the line through which the incoming wash liquid is supplied comprises a strainer 173. Similar means for introducing water at a controlled predetermined temperature have been shown in connection with the embodiments shown in FIGS. 13 and 14 where like reference characters are employed.

It will be seen from the foregoing that liquid circuit means is provided for supplying developing solution to the processing tank from a reservoir therefor and returning it from the tank to the reservoir. Similar circuit means is provided for the fixing solution and each of these liquid circuit means has a portion that is in common with the other and that comprises the impelling pump means. The common portion of the circuits above mentioned likewise is shared by the liquid circuit means for the water or other washing liquid, with the result that not only the films or other photographic elements are washed after treatment with either the developing solution or the fixing solution, but also all portions of the liquid system that are used in common by the developing solution and by the fixing solution so that these solutions at no time are contaminated one with the other and can be used repeatedly in essentially the same way as though the apparatus were of the type wherein separate tanks are used for developing solution and fixing solution and a film or other photographic element is washed after removal from one tank and before being transferred to another tank. It also is the case that a single pump positively provides the liquid movement with rapidity and under exact control in each of the different circuits that are utilized during processing, this same pump means likewise being utilized to maintain the desired turbulence within the processing tank.

The liquid circulating means hereinabove described as combined with the processing tank 35 provides means for processing an exposed photographic element through the steps of developing, rinsing, fixing and final washing. The photographic elements may be removed from the processing tank and dried elsewhere but advantageously drying is accomplished while the photographic elements remain in the processing tank 35. This result may be accomplished after the washing has been completed and excess water has been removed from the processing tank and then, when all of the solenoid valves which control the liquid lines have been closed, energizing the air blower 50 and the heating element means comprised therein so as to blow heated air through the air conduit 49 into the processing tank 35 and over the surfaces of such photographic elements as may be contained therein, vapor-laden air escaping through the air outlet 52. After the photographic elements have been dried to desired extent the blower and heating element therein may then be de-energized.

Figure 11:
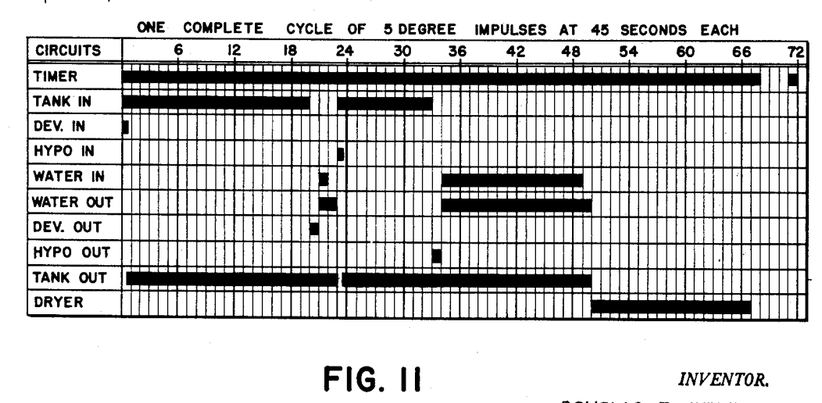
FIG. 11 is a timing chart exemplifying the relative timing of the operational components of the unit shown in FIGS. 1–10.
Figure 12:
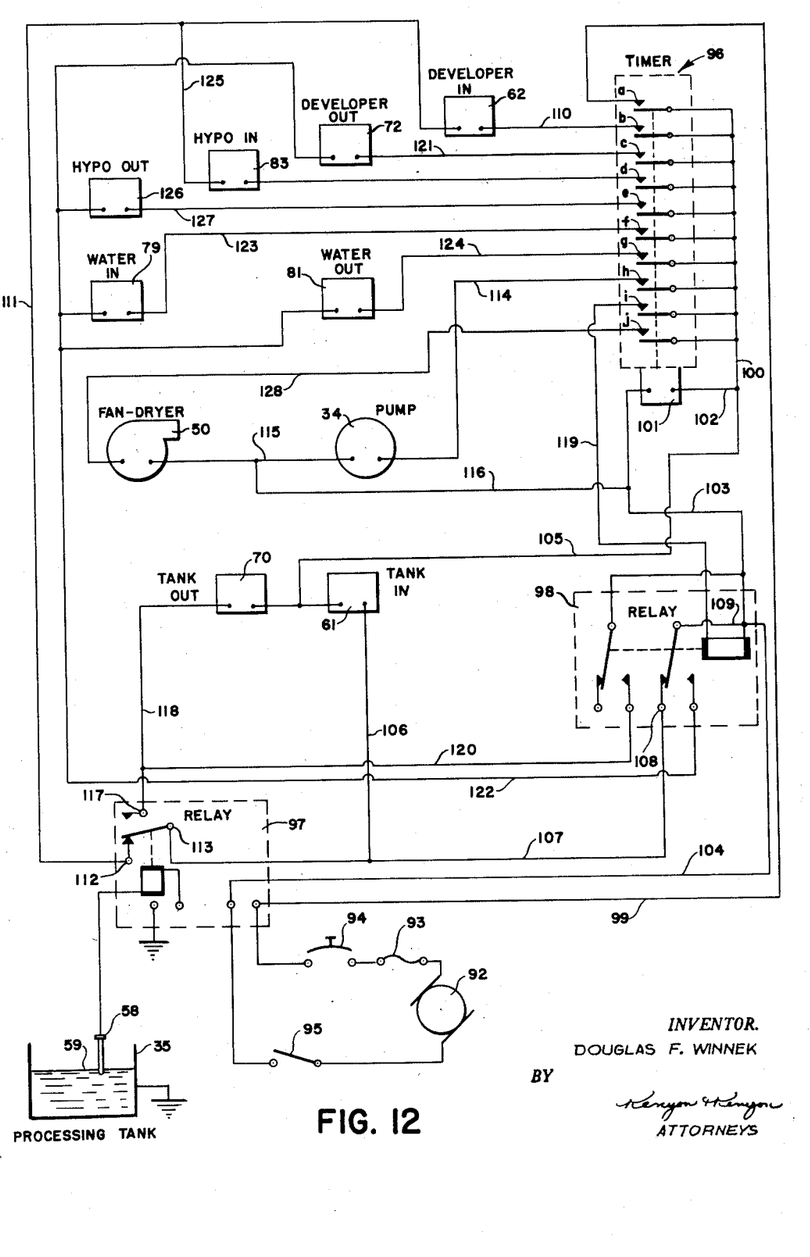
FIG. 12 is a wiring diagram for controlling the operation of the operational components of the unit shown in FIGS. 1–11.

All operational components of the apparatus are preferably controlled electrically so that the sequence of operations is entirely automatic from beginning to end and so that predetermined definite timing is observed. A circuit diagram for controlling the embodiment of this invention shown in FIGS. 1–10 is shown in FIG. 12. A typical schedule of timing for the different essential operating functions in indicated diagrammatically in FIG. 11. The circuit diagram shown in FIG. 12 will now be described in connection with a typical operational example carried out in accordance with the timing intervals as indicated in FIG. 11.

When it is desired to develop an exposed photographic element such as an X-ray film, the drawer 21 is first pulled out so as to expose the open top of the processing tank 35 and make available to the operator any hangers 36 which may be stored as in the chamber 38. The photographic element, or several of them as the case may be, each carried by its hanger, is placed in the processing tank. This operation is carried out in the dark or in the presence of some light to which the photographic element in question is not sensitive. Thereupon the drawer is closed and from this moment on there is no necessity for preserving dark room conditions outside of the cabinet.

The reservoir bottles 24 and 25 have previously been supplied with the developing solution and the fixing solution, respectively, that the operator desires to use. Since the time required for development may vary substantially as between different developers and also varies depending on temperature, the operator after noting the temperature of the developer on the thermometer scale 29 selects the developing time which is appropriate for the particular developer employed. Then all that is necessary is to set the pointer 90 at the desired developing time as indicated on the scale 91 on the timer dial 30 and, having done this, the rest of the processing is carried on automatically. On the chart indicated in FIG. 11 the developing time, as indicated in the line containing the legend "Tank In" is fifteen minutes, this being the maximum that is likely to be encountered. Actually the apparatus and method of this invention lends itself to the use of fast acting developing solutions; and the combined effect of such solutions and the efficiency with which they are used by the method and apparatus of this invention are such that the developing time may be reduced to as little as two or three minutes while still obtaining very desirable results.

Referring more particularly to FIG. 12, the electrical energy may be supplied to the apparatus from any suitable source such as that indicated at 92, which desirably is conventional 115-volt A.C. 60 cycle power. Preferably one of the lines from the source 92 comprises the fuse means 93 and an overload circuit breaker 94. One of the lines likewise preferably comprises the drawer switch 95 which remains open unless the drawer 21 is in fully closed position. It is highly desirable that no energy be supplied to the apparatus unless the drawer 21 is closed with the processing tank in fluid-tight relation with respect to the cover 42. Moreover, it is desirable that the drawer have a latch which minimizes the possibility of accidentally opening it.

The different circuits are controlled by the timing device, which is indicated generally by the reference character 96, as supplemented by the relay 97 and the double throw relay 98 which are actuated in the manner that will be described further hereinbelow.

The timer 96 comprises ten contact arm means, indicated by the reference characters $a$ to $j$, respectively. These contact arms are used to make and break circuits controlled thereby in response to actuation by a motor which is comprised in the timer and which advances the arm actuating and control means comprised in the timer at suitable intervals such as 45 seconds. Suitable timers are well known and desirably are of the rotatable multiple disc type wherein the contact arms are actuated by notches of predetermined location and angular extent in rotatable discs and wherein the pointer 90 in front of the timer dial follows the rotation of the disc elements as they are turned at the expiration of each time interval through a movement which, for example, may be 5 rotational degrees.

When the apparatus is not in use none of the contact arms $a$ to $j$ makes contact. However, when the timer is set for the desired developing period contact is established at arm $a$ to which one of the main current supply lines 99 is connected. The line 99 is thereby connected with the gang line 100, which in turn is connected to one side of the timer motor 101 by the line 102. The other side of the timer motor is connected by the line 103 to the other principal current supply line 104 for completing the circuit through the timer motor, thereby starting its operation. As indicated in the line opposite the legend "timer" in FIG. 11, the timer motor continues to operate throughout the rest of the cycle of operations.

The establishment of contact at contact arm $a$ also actuates the "tank in" solenoid valve 61 to open it through the extension 105 of the gang line 100, the line 106, and the line 107 which is connected to the pole 108 of the relay 98 which is in normally closed relation with the neutral pole 109 that is connected to the feed line 104.

Simultaneously with the establishment of contact at contact arm $a$ contact is also effected at arm $b$ which is connected to the "developer in" solenoid valve 62 by the line 110. The circuit of the solenoid valve 62 is completed through the line 111 to the pole 112 of the relay 97. The pole 112 is in normally closed relation with the neutral pole 113 of the relay 97 which is connected to the line 107 that is in electrically connected relation with the line 104, as hereinabove described. Simultaneously with the establishment of contact at the contact arms $a$ and $b$, contact is also established at the contact arm $h$ which is connected to one side of the pump motor 34 by the line 114. The other side of the pump motor is connected to the bridge line 115 which is connected by the line 116 to the line 103 which, as aforesaid, is connected with power line 104.

It follows from the foregoing that as soon as the timer motor is started the "tank in" and the "developer in" solenoid valves are opened and the pump starts to operate, thus causing the processing tank 35 to be filled very rapidly with developing solution, the filling of the tank preferably requiring about 15 to 30 seconds, as mentioned hereinabove. As soon as the desired liquid level 59 is reached, then, as shown diagrammatically in FIG. 12, an electrical circuit is completed through the solution in the processing tank when the liquid level reaches the probe 58, thereby actuating the relay 97 so as to connect the neutral pole 113 of relay 97 with the normally open pole 117. Preferably the electrical circuit in which the liquid level probe 58 is comprised is energized at a substantially lower voltage, which may be derived by any suitable means (not shown) in relay 97. When relay 97 is actuated to connect the neutral pole 113 with the normally open pole 117 the "developer in" solenoid valve is de-energized and the "tank out" solenoid valve 70 is energized by causing the circuit to be completed between lines 105 and 107, through the line 118 and the relay 97. Under these conditions the developing solution is continuously pumped into the processing tank 35 and withdrawn therefrom at the same rate, thereby maintaining the liquid level within the processing tank and providing the essential controlled liquid turbulence of the developing solution throughout the period from initial introduction of developer; as indicated by the line of FIG. 11 bearing the legend "Tank In," this period may be fifteen minutes, depending on the initial manual setting of the timer. Upon the expiration of this period, contact is established at the contact arm $i$ for energizing the relay 98 through the line 119, thereby breaking the circuit containing the "tank in" solenoid 61 while preserving the circuit for the "tank out" solenoid 70 through the alternative connecting line 120. Simultaneously contact is established at the contact arm $c$ with the "developer out" solenoid valve 72, whose circuit is completed by the lines 121 and 122. Under these conditions the developer in the processing tank 35 is rapidly pumped back into the reservoir bottle 24 and as soon as the liquid level 59 falls below the probe 58 the relay 97 is actuated to its normally closed position. However, while the developer can be pumped back into the bottle 24 during an interval of about 15 to 30 seconds, a return period of about 45 seconds is provided in order to insure thorough draining of the processing tank 35, as indicated in the line opposite the legend "Dev. Out" in FIG. 11. Thereupon contact at contact arms $b$ and $c$ is disestablished in the lines for the "developer in" solenoid valve 62 and the "developer out" solenoid valve 72.

With the control elements otherwise remaining unchanged, contact is now established at the contact arms $e$ and $f$ for energizing the "water in" solenoid valve 79 and the "water out" solenoid valve 81 which are in the lines 123 and 124, respectively, that are connected with the line 122. Under these conditions the photographic elements within the processing tank are thoroughly washed with the water spray and the pump and associated lines which are common to the liquid circuits for the developing solution and fixing solution are thoroughly flushed and rinsed. This rinsing operation may be timed for a duration of 45 seconds, as indicated in the line opposite the legend "Water In" in FIG. 11, after which the contact is disestablished at the contact arm $f$, thereby de-energizing the "water in" solenoid. After an additional interval of 45 seconds, as indicated on the chart of FIG. 11 opposite the legend "Water Out," contact is disestablished at the contact arm $e$, thereby also de-energizing the "water out" solenoid valve 81.

After the conclusion of the rinsing operation contact is disestablished at the contact arm $i$, thereby de-energizing the relay 98 so that both arms of the double throw switch will return to their normally closed positions, one effect of which is to immediately energize the "tank in" solenoid valve 61. Simultaneously with the de-energizing of the relay 98 contact is established at contact arm $d$ for energizing the "hypo in" solenoid valve 83 which is in the line 125 that is connected with the line 111. Under the conditions thus established the fixing solution is rapidly supplied to the processing tank 35 and when the liquid level 59 reaches the probe 58 the relay 97 is again actuated, thereby de-energizing the "hypo in" solenoid valve 83 and energizing the "tank out" solenoid valve 70 for causing the fixing solution to be circulated from the back into the processing tank 35 for maintaining turbulence therein. At the expiration of a period of seven minutes and 30 seconds from the time when the fixing solution was first introduced into the processing tank 35, as indicated in the line opposite the legend "Tank In" in FIG. 11, contact is established at the contact arm $i$ for actuating the relay 98 to thereby de-energize the "tank in" solenoid valve 61 while the "tank out" solenoid valve 70 remains energized. Simultaneously contact is established at the contact arm $e$ for energizing the "hypo out" solenoid valve 126 which is in line 127, thereby causing the fixing solution within the processing tank 35 to be pumped back into the reservoir bottle 25 therefor. During this period the relay 97 returns to its normally closed position.

The controls for returning the fixing solution to the reservoir bottle 25 keep the "hypo out" solenoid valve 126 open for an additional 45 seconds, as indicated in FIG. 11 in the line opposite the legend "Hypo Out." At the expiration of this period contact is disestablished at the contact arms $d$ and $c$ in the lines for the "hypo in" solenoid valve 83 and the "hypo out" solenoid valve 85, respectively, and both the "water in" solenoid valve 79 and the "water out" solenoid valve 81 are energized, thus starting the washing period during which the "tank in" solenoid valve 61 remains de-energized and the "tank out" solenoid valve 70 remains energized. The washing is continued for eleven minutes 15 seconds and at the expiration of this period the "water in" solenoid valve is de-energized and the processing tank is permitted to thoroughly drain during the next 45 seconds, at the conclusion of which all of the solenoid valves as well as the relays and the pump 34 are de-energized.

The only remaining step is that of drying the film or other photographic element within the processing tank 35 and this is accomplished by establishing contact at the contact arm $j$ so as to energize the fan 50 and the heating element comprised therein, the fan 50 and the heating element comprised therein being in the line 128.

A drying period of twelve minutes 45 seconds is suitable, as indicated in FIG. 11 in the line opposite the legend "Dryer." At the expiration of this period contact at the contact arm $j$ is disestablished, thus de-energizing the fan 50 and at the end of the next succeeding 45-second interval, the contact at contact arm $a$ is disestablished, thereby de-energizing the timer motor 101, the full processing cycle now having been completed.

After the completion of the processing cycle as aforesaid, the developed and dried films or other photographic elements are available upon opening the drawer 21 and removing them from the processing tank 35 which is comprised in the dryer.

While this invention has been described hereinabove in connection with a typical embodiment thereof and in connection with a typical example, it is to be understood that this has been done merely for illustrative purposes and that the embodiments of this invention may be varied in the practice thereof. For the purpose of further illustrating the practice of this invention reference is made to FIG. 13, which is a flow diagram similar to that shown in FIG. 10 but utilizing different liquid circuit means for effecting the essential operational steps.

Figure 13:
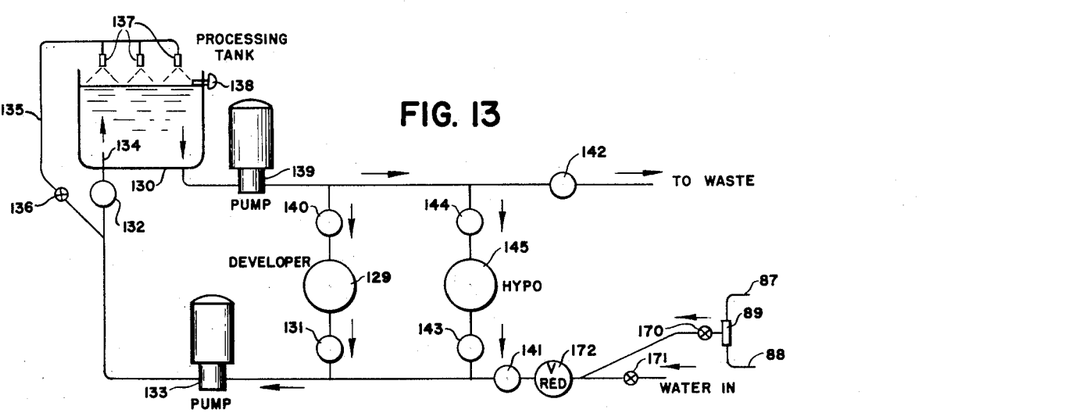
FIG. 13 is a schematic flow diagram of an alternative embodiment of this invention.

In the embodiment of this invention shown in FIG. 13 two pumps are employed which may be selectively actuated. In a typical processing cycle the first step is that of supplying developing solution from the reservoir bottle 129 for the developer solution to the processing tank 130. To accomplish this the "developer in" solenoid valve 131 and the "tank in" solenoid valve 132 are each energized to open them to establish the liquid supply conduit and at the same time the pump 133 is caused to start operating. This causes the developing solution to be fed into the tank 130 very rapidly through the inlet 134 and means is preferably provided for causing a portion of the developer solution to be directed through the line 135 controlled by the valve 136 to the spray nozzles 137. As soon as the liquid level reaches the probe 138 the pump 139 is set into operation and the "developer out" solenoid valve 140 is energized to establish the liquid return conduit. The pumps 133 and 139 have substantially the same capacity and under the conditions stated the developing solution will be circulated into the processing tank 130 and from the processing tank 130 back to the reservoir bottle 129 at substantially the same rate, thus maintaining the desired liquid level in the processing tank and maintaining the proper conditions of turbulence therein.

During the foregoing operations the other solenoid valves shown in FIG. 13 are closed and after the desired developing period has been completed the "developer in" solenoid valve 131 is closed and after an emptying period of a minute or so the "developer out" solenoid valve 140 is closed. Thereupon the "water in" solenoid valve 141 and the "water out" solenoid valve 142 are opened while the pumps 133 and 129 continue to operate, thereby causing rinsing water to circulate through the processing tank 130. It is preferable during this operation to close the "tank in" solenoid valve 132 so that the rinse water will be used more efficiently for being sprayed from the nozzles 137 onto the films or other photographic elements disposed within the processing tank 130. It is to be noted that during the water rinsing operation portions of the liquid circuits traversed by the developing solution including both of the pumps are thoroughly flushed with the rinsing water. In order that the portion of the liquid circuit in the region of the inlet 134 of the processing tank may be rinsed with water, the closing of the solenoid valve 132, if effected, may be delayed so as to follow by a few seconds the pumping of the rinsing water into the processing tank 130.

After the water rinsing step has been completed, then the "water in" solenoid valve is closed and a few seconds later the "water out" solenoid valve 142 is closed. At this time the "hypo in" solenoid valve 143 is opened and the fixing solution is pumped into the processing tank 130 and as soon as its level reaches the probe 138 the "hypo out" solenoid valve 144 is opened so as to establish liquid return conduit for pumping the fixing solution from the reservoir bottle 145 to the processing tank 130 and back to the reservoir bottle 145.

At the conclusion of the desired period for fixing the "hypo in" solenoid valve 143 is closed and shortly thereafter the "hypo out" solenoid valve 144 is closed, whereupon the "water in" solenoid valve 141 and the "water out" solenoid valve 142 are opened, the "tank in" solenoid valve 132 being closed a few moments thereafter so as to direct the wash water through the spray nozzles 127.

After the washing has been completed all of the solenoid valves and the pumps are de-energized and the processing cycle is completed except for final drying, which may be accomplished while the films or other photographic elements remain in the processing tank 130 as, for example, in the manner hereinabove described.

The processing tank 130 and the operating parts associated therewith, as shown in FIG. 13, may be housed in a suitable cabinet such as that described hereinabove in connection with FIGS. 1–12.

Figure 14:
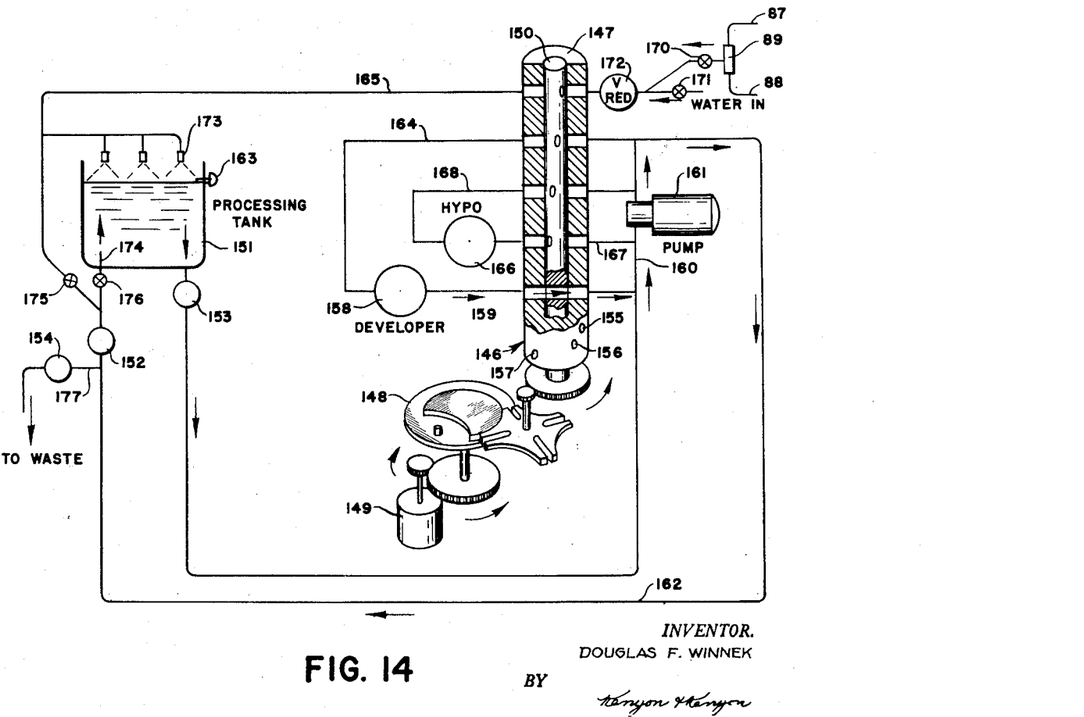
FIG. 14 is a schematic flow diagram of a further embodiment of this invention whereby fluid control is effected by mechanical valve means in that portion of the unit which is stationary, as distinguished from the portion of the unit that is movable with the movable processing tank.

An alternative embodiment of this invention is shown in FIG. 14, which illustrates how the liquid circuit means may be controlled by mechanical type valve means as distinguished from solenoid valve means. The mechanical valve means as well as the other components of the apparatus have been shown merely diagrammatically in FIG. 14.

The mechanical type valve means is indicated generally by the reference character 146. A ported valve sleeve 147 may be employed which is given rotational impulses through, for example, twelve different rotational positions per revolution by the actuating mechanism 148 which may be of the well known Geneva type. The mechanism 148 is shown as operated by a suitable motor 149 which may be actuated under the control of a timing mechanism (not shown) so as to advance the rotation of the sleeve 147 through its different rotational positions at intervals of desired duration. The flow of both developing solution and fixing solution is controlled by rotation of the sleeve 147 relative to the ported stationary member 150, the flow being established whenever a port means in the member 150 is in registration with the port means in opposite walls of the sleeve 147. A fluid control valve of the type shown in FIG. 14 may be readily utilized in that part of a processing unit which remains stationary as distinguished from the valve means more closely associated with the inlet and outlet of the processing tank 151 and which may conveniently move integrally with the processing tank when the processing tank is comprised in a drawer that is adapted to be opened and closed with reference to a cabinet type unit. More specifically, the "tank in" valve 152, the "tank out" valve 153 and the "to waste" valve 154 are shown as being of the solenoid valve type. Since these valves are opened and closed at appropriate settings of the mechanical valve means 146, the electrical circuits for the valves 152, 153 and 154 may be controlled conveniently by contacts associated with the rotating sleeve 147, e.g., contacts such as the contacts 155, 156, 157, which may be brought into connecting relation with suitable cooperating contact elements of circuits (not shown) that control the energizing and de-energizing of the solenoid valves 152, 153 and 154.

When the device is not in use the valve 146 may be in a first position wherein none of the liquid circuits is completed. To start the processing cycle, the parts are first brought to the position shown in FIG. 14 wherein the valve 146 is in a second position which establishes the fluid circuit for the developing solution from the reservoir bottle 158 through the line 159 to the line 160 that is on the inlet side of the pump 161 that has been placed in operation. At the same time the "tank in" solenoid valve 152 is opened and the developing solution is pumped through the line 162 so as to flow into the processing tank 151 and be admitted both at the tank inlet 174 and the spray nozzles 173 in relative inoperation depending on the setting of the valves 175 and 176. As soon as the liquid level in the processing tank 151 reaches the probe 163, the valve 146 is given a rotational impulse to a third position which disestablishes the liquid circuit through the valve 146 while at the same time energizing the "tank out" solenoid valve 153 so that continued operation of the pump 161 will circulate the developing fluid through the processing tank for maintaining the desired turbulence therein. As soon as the desired period of development has been substantially completed the valve 147 is given another rotational impulse to a fourth position which establishes the fluid circuit through the line 164 and de-energizes the "tank in" solenoid 152, thereby causing the developing solution in the processing tank 151 to be returned to the reservoir bottle 158 by the action of the pump 161.

Further rotational impulse of the valve 146 to a fifth position establishes the liquid circuit in the water inlet line 165, the "tank out" solenoid valve 153 and the "to waste" solenoid valve 154 being energized to open them at the same time so as to cause the wash water to be admitted through the spray nozzles 173 as well as through the inlet 174 and simultaneously pumped out of the processing tank 151 and thence out of the apparatus via the lines 160, 162 and 177. It is to be noted that during this rinsing step the wash water flushes out the entire system previously traversed by the developing solution.

A further rotational impulse of the valve 146 to a sixth position serves to disconnect the water inlet line 165 while the "tank out" solenoid valve 153 and the "to waste" solenoid valve 154 remain open.

After the rinse has been completed following the employment of the developing solution, the steps utilized in connection with the developing solution are repeated except that the solution which is used is the fixing solution contained in the reservoir bottle 166, namely, the fixing solution is first pumped out of the bottle 166 through the line 167 so as to be pumped into the processing tank 151 when the valve 146 is in a seventh position, the fixing solution is then circulated during the desired period required for fixing when the valve 146 is in an eighth position, and fixing solution is lastly returned to the reservoir bottle 166 through the line 168 when the valve 146 is in a ninth position. The final washing step is then accomplished in the manner hereinabove described in connection with the rinsing step when the valve 146 is in tenth and eleventh positions. At this time the pump 161 may be de-energized and a fan energized for blowing warm air through the processing tank as by turning valve 146 to a twelfth position; and when the drying has been completed the valve 146 may then be turned to the original off position.

Hereinabove this invention has been described in connection with a unit in which the processing tank is comprised in a drawer of a suitable cabinet and the "tank in" and "to waste" solenoid valves are located in line means that moves integrally with the drawer and, while this is considered to be preferable, nevertheless these solenoid valves could be mounted in fixed position and utilizing a flexible hose between the "tank in" solenoid valve and the inlet of the processing tank. When these valves are thus mounted in fixed position it is apparent the valves 152, 153 and 154 of FIG. 14 may be comprised in the mechanical valve 146.

The embodiments of this invention which have been shown and described hereinabove have comprised a suitable cabinet in which provision is made for reservoir bottles which, according to the example given hereinabove, may be adapted to hold about five gallons of developing solution and fixing solution respectively. It is not necessary, however, for these bottle reservoirs to be housed within the cabinet. If desired, the cabinet may be reduced to still smaller size by omitting that portion immediately behind the access doors 23 and by placing the reservoir bottles in some other location as, for example, in an adjoining service room where the bottle reservoirs may be disconnected from suitable hose connections and replaced without the necessity for entering the room wherein the processing actually takes place. Whether or not the reservoir bottles are housed within the same cabinet which contains the rest of the apparatus, the reservoir bottles may have connections with the hoses connected thereto by readily releasable connection means so as to facilitate replacement of the reservoir bottles from time to time whenever needed.

Particularly when the processing unit is made up so that the reservoir bottle means is not within the same cabinet as the rest of the apparatus, common reservoir bottle means may be used for supplying a plurality of processing units which may, for example, be arranged in a battery, thereby providing very large processing capacity while requiring a minimum of floor space.

While it is regarded as preferable that the processing tank be comprised in a movable drawer, it is not necessary that this be the case. For example, the processing tank may be in fixed relation to the rest of the apparatus and merely provided with a cover that is removable for providing access to the processing tank.

While it is normally advantageous to complete a processing cycle which has once been started, nevertheless the apparatus of this invention is such that the operational cycle may be interrupted at any time and, if desired, a film that is being processed may be examined in ordinary light at any time after the development has continued to a point at which the film is no longer excessively sensitive to light and all that is required in any such case is to open the drawer or otherwise remove the cover from the processing tank, thereby making accessible the hanger for the film to be inspected. Alternatively, if dark room illumination is employed the films may be removed at any time for inspection. Such removal may be desirable under special circumstances as, for example, when several films or other photographic elements are being processed which for proper development may require substantially different developing times. In such case if the development of one film has been completed while others require additional development, the film whose development has been completed may be removed and placed in a bath of short stop until the development of the film requiring the longest developing period has been completed. At that time any of the films which have been placed in the bath of short stop may be replaced in the processing tank so as to undergo the rest of the steps involved in the complete process. In this connection it may be mentioned that for operations of this type one of the chambers 38 or 39 comprised in the drawer 21 may be conveniently used for a bath of short stop solution.

By use of the spray nozzles, such as the spray nozzles employed in the embodiment of this invention shown in FIGS. 1-12, one is enabled to contact the entire area of a film or other exposed element to be developed at substantially the same instant substantially uniformly throughout. Consequently all parts of the photographic element are developed for substantially the identical period of time. If the spray nozzles are not employed, then during the initial period when the processing tank is being filled with developing solution the lower portion of the film is subjected to the action of the developing solution while the upper portion is not and the lower portion is developed for a slightly longer period than the upper portion of the film to the extent of the time required to fill the processing tank, namely, a period of the order of 15 to 30 seconds. In actual practice using conventional developing solutions requiring upwards of three or four minutes for development no appreciable lack of uniformity may be noted under the conditions mentioned if the spray nozzles are not employed during the period when the processing tank is being filled. The use of the spray nozzles becomes more important in connection with the developing period when a very rapid developer is used which effects the development in a very short period such as one or two minutes. However, even in such case an equalization of developing time can be substantially accomplished by omitting the use of the spray nozzles not only in connection with the developer but also in connection with the rinsing solution, for in such case if the rinsing solution is introduced into the processing tank at substantially the same rate that the developing solution is introduced, thereby filling the processing tank to the liquid level determined by the probe at the same rate that the filling step was accomplished in the case of the developer, the period during which the developing solution is in contact with the film or other photographic element will be substantially the same in both the lower and upper portions of the processing tank.

In the event that the spray nozzles are not employed in any of the processing steps the apparatus may be utilized without any cover for the processing tank if throughout the developing period the operation is carried out utilizing a safe light or other dark room type of illumination. Equalization of development period for all parts of a film or other photographic element may also be provided by using hangers mounted for rotation about a central axis perpendicular to the hanger planes and causing the hangers to be rotated about this axis while in contact with the developing solution. Thus if at the conclusion of the developing step the hangers are in position rotated 180° from their position when the developing step was instituted the films or other photographic elements carried by the hangers will be in contact with the turbulent developing solution for the same interval of time throughout all portions thereof.

I claim:

1. Apparatus for processing an exposed photographic element which comprises a processing tank for disposition of said element in contact with liquid contained in said tank, a liquid reservoir, liquid supply conduit means for directing a liquid from said liquid reservoir to said tank, liquid return conduit means for directing liquid from said tank to said reservoir, pump means comprised in said liquid supply conduit means for impelling liquid supplied to said tank by said liquid supply means, said liquid supply means being connected to an inlet for introducing liquid en masse into said tank to fill said tank for effecting rise in the liquid level in said tank about photographic elements disposed in said tank, and spray nozzle means disposed for projecting a spray into contact with a photographic element disposed in said tank, said spray nozzle means being connected to said liquid supply conduit means for spraying therefrom liquid supplied from said reservoir.

2. Apparatus for processing an exposed photographic element which comprises a processing tank for disposition of said element in contact with liquid contained in said tank and having adjacent the bottom thereof an inlet and an outlet, a liquid reservoir, means for supplying said tank en masse through said inlet with liquid from said reservoir for contacting therewith a photographic element disposed therein, means for returning liquid from said tank through said outlet to said reservoir, spraying means adapted to direct a spray into contact with a photographic element disposed in said tank, means for supplying washing liquid to said spraying means, and means for removing from said tank through said outlet washing liquid emitted from said spraying means.

3. Apparatus for processing an exposed photographic element which comprises a processing tank having a body portion and a cover, a first reservoir, means for feeding liquid from said first reservoir into said tank, means for circulating liquid fed into said tank from said first reservoir from said tank and back into said tank, means for returning liquid from said tank to said first reservoir, a second reservoir, means for feeding liquid from said second reservoir into said tank, means for circulating liquid fed into said tank from said second reservoir from said tank and back into said tank, means for returning liquid from said tank to said second reservoir, spray nozzles carried by the underside of said cover, means for supplying liquid under pressure to said spray nozzles, means for removing liquid sprayed into said tank by said spray nozzles from said tank, means for mounting said cover in fixed position relative to said reservoirs, means for mounting said body portion of said tank for movement relative to said cover between positions with said cover in covered and uncovered relation with respect to said body portion, means for directing air under pressure into said tank through an aperture in said cover, and means comprising a second aperture in said cover for directing air from said tank.

4. Apparatus for processing an exposed photographic element which comprises a processing tank having a body portion and a cover, a first liquid reservoir, a second liquid reservoir, means including flexible liquid conduit means connecting said body portion of said tank with said reservoirs, for sequentially introducing and withdrawing from operative relation with a photographic element within said tank liquid from said first and second reservoirs, means for supporting said cover in stationary relation with respect to said reservoirs, and means for moving said body portion of said tank relatively to said cover between an accessible uncovered position and a covered position.

5. Apparatus for processing an exposed photographic element which comprises a processing tank having a body portion and a cover, means for mounting said cover in fixed position, means for mounting said tank for lateral movement relative to said cover between position with said cover in covering relation with respect to said body portion and position with said body portion uncovered for affording accessibility to the interior thereof, means for feeding liquid into said tank through said cover, and means including flexible conduit means for removing liquid from the body portion of said tank.

References Cited in the file of this patent

UNITED STATES PATENTS

| | | |
|---|---|---|
| 2,248,056 | Blaney | July 8, 1941 |
| 2,342,394 | Fullerton | Feb. 22, 1944 |
| 2,534,603 | Katzen et al. | Dec. 19, 1950 |
| 2,570,627 | Albin | Oct. 9, 1951 |
| 2,621,571 | Katzen et al. | Dec. 16, 1952 |
| 2,629,304 | Tuttle et al. | Dec. 24, 1953 |
| 2,764,074 | Rosenberg | Sept. 25, 1956 |
| 2,800,845 | Nieth | July 30, 1957 |

FOREIGN PATENTS

| | | |
|---|---|---|
| 392,216 | Germany | Mar. 18, 1924 |
| 407,243 | Germany | Dec. 24, 1924 |
| 547,673 | Great Britain | Sept. 7, 1942 |
| 847,547 | Germany | Aug. 25, 1952 |
| 685,474 | Great Britain | Jan. 7, 1953 |